US012703439B2

(12) United States Patent
Algüera et al.

(10) Patent No.: US 12,703,439 B2
(45) Date of Patent: Aug. 11, 2026

(54) SEMIPERMEABLE WIND DEFLECTOR SYSTEM

(71) Applicant: JOST-WERKE DEUTSCHLAND GMBH, Neu-Isenburg (DE)

(72) Inventors: José Algüera, Aschaffenburg (DE); Stephan Gitzen, Riedstadt (DE); Michael Fischer, Nagold (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 404 days.

(21) Appl. No.: 18/550,473

(22) PCT Filed: Mar. 14, 2022

(86) PCT No.: PCT/EP2022/056509

§ 371 (c)(1),
(2) Date: Sep. 14, 2023

(87) PCT Pub. No.: WO2022/194763

PCT Pub. Date: Sep. 22, 2022

(65) Prior Publication Data

US 2024/0149954 A1 May 9, 2024

(30) Foreign Application Priority Data

Mar. 16, 2021 (DE) ........................ 102021106408.2

(51) Int. Cl.
*B62D 35/00* (2006.01)

(52) U.S. Cl.
CPC ................................. *B62D 35/001* (2013.01)

(58) Field of Classification Search
CPC .................................................. B62D 35/001
See application file for complete search history.

(56) References Cited

U.S. PATENT DOCUMENTS 3,711,146 A 1/1973 Madzsar et al.
3,834,752 A 9/1974 Cook et al.
3,934,923 A 1/1976 Lissaman et al.
4,257,640 A 3/1981 Wiley
4,611,847 A 9/1986 Sullivan
4,707,015 A * 11/1987 Klomfass ............ B62D 35/001 296/180.4
6,428,084 B1 8/2002 Liss
8,167,358 B2 5/2012 Burrows
(Continued)

FOREIGN PATENT DOCUMENTS

DE 3115742 A1 11/1982
DE 102020004794 A1 11/2020
(Continued)

OTHER PUBLICATIONS

DE 10230285 A1 (Year: 2004).*

*Primary Examiner* — Lori Lyjak
(74) *Attorney, Agent, or Firm* — Hudak, Shunk & Farine Co. LPA

(57) ABSTRACT

A wind deflector system for at least partially covering a gap between a pulling vehicle and a pulled vehicle coupled to the pulling vehicle is described, having at least one deflector element attachable to a vehicle. At least one deflector element includes a base body with at least one air-permeable surface section.

20 Claims, 16 Drawing Sheets

(56) References Cited

U.S. PATENT DOCUMENTS

| | | | | |
|---|---|---|---|---|
| 8,506,004 | B1 * | 8/2013 | Vogel | B62D 35/001 296/180.1 |
| 2005/0044867 | A1 | 3/2005 | Laizer | |
| 2014/0028049 | A1 * | 1/2014 | Vogel | B62D 35/001 296/180.2 |

FOREIGN PATENT DOCUMENTS

| | | | |
|---|---|---|---|
| EP | 0217610 | A2 | 9/1986 |
| EP | 0960772 | A2 | 12/1999 |

* cited by examiner

SEMIPERMEABLE WIND DEFLECTOR SYSTEM

FIELD OF THE INVENTION

The invention relates to a wind deflector system for at least partially covering the gap between a pulling vehicle and a pulled vehicle coupled to the first vehicle having at least one deflector element attachable to a vehicle. The invention also relates to a vehicle train comprising a pulling vehicle and a pulled vehicle and having a wind deflector system attached to the pulling vehicle.

BACKGROUND OF THE INVENTION

In the context of the invention, a pulling vehicle is understood to mean, for example, the tractor of a semi-trailer truck or a motor vehicle of an articulated train. A pulled vehicle is understood to mean, for example, a semi-trailer or a full trailer.

During driving operation, for example, in the case of a semi-trailer truck, the tractor and the semi-trailer are always releasably coupled to each other via a coupling device comprising a fifth wheel coupling and a king pin. However, the invention may also be realized on an articulated train consisting of a motor vehicle as the tractor and a full trailer as the trailer vehicle. Such vehicles are usually connected to each other by means of a coupling device comprising a pin coupling and a drawbar held therein.

In addition, in multi-unit trailer vehicles, it is also possible for the tractor vehicle to include a front semitrailer or trailer located closer to the tractor vehicle and for the trailer vehicle to include a rear semitrailer or trailer spaced farther from the tractor or motor vehicle.

When coupled, there is a gap between the pulling vehicle and the pulled vehicle in which considerable turbulence of the overflowing air occurs during travel, resulting in relatively high fuel consumption. A specified minimum gap width is necessary, however, because there is relative movement between the tractor and trailer vehicle, especially when cornering, and otherwise there is a risk that the inside front corner of the trailer vehicle will collide with the tractor during sharp cornering. Also, during sharp braking, parts of the trailer vehicle may collide with the tractor due to load change reactions.

U.S. Pat. No. 6,428,084 B1 therefore discloses a system comprising covers designed to substantially close or cover the gap. An upper cover can be moved by means of a cylinder. The disclosed system provides that whenever reverse gear is engaged, the upper cover is moved upward so that the upper cover does not strike the semitrailer and become damaged during the coupling operation. The top cover is then moved downward, causing it to rest on the semi-trailer.

In the past, there have been efforts to cover the gap between the tractor and trailer vehicle, for example, with air deflectors. U.S. Pat. No. 3,711,146, for example, describes an air deflector skirt that engages the rear wall of the driver's cabin and comprises a number of segments that can be telescoped in relation to one another along the longitudinal axis of the vehicle. Before driving off, the segments are extended and the width of the air deflector skirt is adapted to the width of the actual gap in such a way that the gap is largely covered. The segment of the air deflector skirt adjacent to a semitrailer should be made of rubber or another elastic material and allow parts of the semitrailer to abut when driving through larger curve radii. For tight curve radii or a trailer change, the air deflector skirt can be pushed back toward the cab manually or by means of actuating cylinders. The main disadvantage of this known air deflector skirt is that it is adjusted before driving and the semitrailer abuts the air deflector skirt, which cannot be avoided. This repeatedly results in damage to the air deflector skirt or the semi-trailer.

U.S. Pat. No. 3,834,752 represents further prior art. Here, the gap between the tractor and trailer is bridged by means of an inflatable airbag, which is attached to the front of the trailer and is detachably attached to the rear wall of the driver's cab after the tractor has been coupled. The otherwise closed air bag is inflated via a compressed air line of the tractor and thus stabilized. The compressed air supply to the airbag is to be provided in particular by the compressor of the vehicle brake system. It has proved disadvantageous that the tractor must be equipped with a considerable compressor power in order to fill not only the brake system but also the volume of the airbag, which is several cubic meters in size. This problem is exacerbated if the air bag leaks due to damage and the compressor is therefore no longer able to fill the pressure accumulators of the brake system. Under certain circumstances, this could lead to failure of the brake system, causing the semi-trailer truck or the articulated train to come to a standstill.

In all known wind deflector systems, the gap is largely sealed so that no pulled vehicles can be used that are equipped with auxiliary units, which are preferably located at the front of the pulled vehicle and require fresh air for operation. This is the case, for example, with cooling units, which usually have internal combustion engines.

SUMMARY OF THE INVENTION

It is therefore the object of the invention to provide a wind deflector system which largely prevents turbulence in the gap but at the same time allows drive equipment of auxiliary units in the gap to be supplied with fresh air to a sufficient extent.

The object is achieved with at least one deflector element that comprises a base body with at least one air-permeable surface section.

The wind deflector system for at least partially covering a gap between a pulled vehicle and a pulled vehicle coupled to the pulled vehicle comprises at least one deflector element which is attachable to a vehicle, wherein the at least one deflector element comprises a base body with at least one air-permeable surface section.

Preferably, the base body is air-impermeable and may be, for example, a plate.

It is preferred that the deflector element comprises only one air-permeable surface section extending over almost the entire surface of the deflector element. In this case, the base body is preferably formed as a frame.

According to further embodiments, the base body is a circumferential frame, a partial frame or a frame section. Preferably, the base body is the part of the deflector element with which the deflector element is attached to the vehicle.

According to a further embodiment, the base body forms an edge region of the air-permeable surface region.

Preferably, the air-permeable surface section comprises a predetermined minimum air permeability.

The minimum air permeability is adjusted such that the volumetric flow rate entering the gap meets the fresh air requirement of an auxiliary unit located in the gap.

The air permeability of the surface section can be determined by an air permeability measurement in which the surface section is subjected to a defined overpressure of, for example, 50 Pa, which corresponds to wind force 5, and then the volume flow that passes through the surface section at this pressure is measured.

The airstream of the vehicles generates an overpressure at the deflector element and thus also at the air-permeable surface section, which depends on the speed of the vehicles. It is preferred to base the determination of the minimum air permeability and the design of the surface section on the pressure conditions that occur at speeds greater than 50 km/h.

Preferably, the at least one air-permeable surface section is designed such that the air exiting the surface section is free of turbulence. The air-permeable surface section reduces the air velocity of the impinging air flow and simultaneously effects a homogenization of the air flow. Such a homogenized air flow is turbulence-free. By turbulence-free is meant an air flow that does not comprise any vortices with a diameter greater than 5 cm.

Since there is therefore no turbulence in the gap, considerable fuel savings are also achieved, as is the case with prior art wind deflector systems with completely closed gaps.

Such air-permeable surface sections can be made of a variety of materials.

The materials of the air-permeable surface sections may be rigid, elastic or flexible materials.

According to a first embodiment, the air-permeable surface section comprises a fabric-like material.

Preferably, the fabric-like material is a textile sheet material comprising at least two thread systems, warp and weft, which cross each other in a patterned manner at an angle of about 90 degrees when viewed from the fabric surface.

Woven fabric also includes knitted fabrics and similar mesh-like structures.

Preferably, the woven fabric-like material is an open-worked woven fabric that comprises open-worked, net-like surfaces.

The fabric-like material is preferably a metal fabric, in particular a wire fabric.

The fabric-like material is preferably a mesh fabric. Mesh fabrics are open wire fabrics with openings (meshes) between the wires woven at a distance. The wires preferably have a round cross-section.

Woven fabrics made of high-strength plastic, carbon or glass fibers may also be used.

The mesh-like material may also comprise high-strength plastic, carbon or glass fibers.

According to a second embodiment, the surface section comprises a mesh-like material having mesh openings.

A mesh is preferably a textile sheet material having regular mesh openings, also referred to as meshes. These meshes may be rhombic, square or hexagonal in shape.

A distinction is made between nets with knots and knotless nets, which are also referred to as knitted fabrics.

Preferably, the fabric-like or mesh-like material is made of a thermoplastic material. Polyamide may be used as the thermoplastic material.

Preferably, the mesh-like material consists of an elastic thermoplastic material. Such materials are known, for example, under the term elastane.

Woven fabrics or nets made of elastic material have the advantage that they expand when hit by a strong air flow, especially an air flow that already contains turbulence, which automatically increases the air permeability. Such strong air currents occur, for example, when there is a crosswind or even higher vehicle speeds. The crosswind sensitivity of the vehicle train is reduced because more air can enter the gap, which improves the driving stability of the vehicles.

According to a third embodiment, the air-permeable surface section comprises a grid-like material with grid openings.

A grid is a lattice-like arrangement of elongated members evenly spaced. Often, two crossed layers of individual parts are used. Generally, a grid has a surrounding border. Preferably, plastic is used as the material.

Preferably, the grid-like material consists of a metallic material or high-strength thermosets. Metallic grids have the advantage of being stronger and more robust than, for example, nets or woven fabrics. They also have a longer service life. In particular, when the largest possible air-permeable surface sections are required, metallic grids are more suitable.

According to a fourth embodiment, the air-permeable surface section comprises at least one slit-shaped opening.

The slit-shaped opening is arranged such that it is oriented horizontally or vertically when the deflector element is arranged on the vehicle.

The air-permeable section may comprise a plurality of slit-shaped openings, which may be horizontally and/or vertically oriented.

Vertically oriented slot-shaped openings have the advantage that the airstream can penetrate the openings more easily than is the case with the horizontally oriented slot-shaped openings.

The air-permeable surface section may comprise, for example, a film comprising such openings.

Preferably, the openings of said materials comprise a largest extension L of 0.1 mm to 10 mm, in particular 5 mm to 10 mm and particularly preferably 5 mm to 8 mm.

Preferably, the openings cover 10% to 50%, more preferably 10% to 25% of the area of the surface section. A desired air volume can also be specifically adjusted via the size of the area of the surface section in conjunction with the percentage of the openings.

Preferably, the deflector element comprises as a base body a frame on which a fabric-like material, a mesh-like material, a grid or a sheet-like material with slit-like openings is arranged or gripped.

According to a fifth embodiment, the deflector element comprises an air-permeable surface section having a brush-like structure.

Preferably, the brush-like structure comprises bristle-like members attached to the base body.

The base body may be a sheet-like structure, a plate, a plate-like structure, or a strip.

Preferably, the bristle-like elements are arranged in at least one row side by side and spaced apart.

Preferably, at least two rows are arranged side by side with the bristle-like elements offset from each other.

Preferably, the bristle-like elements are made of a thermoplastic material or an elastomer.

Preferably, the bristle-like elements are horizontally oriented when the deflector element is attached to the vehicle.

Preferably, the bristle-like elements comprise a diameter of 0.5 mm to 5 mm.

Preferably, the length of the bristle-like elements is greater than or equal to the width of a gap.

Preferably, the distance A between adjacent bristle-like elements is from 0.2 mm to 5 mm.

The various embodiments of the surface sections may also be combined in a deflector element having a plurality of air-permeable surface sections.

Preferably, the base body forms an edge region of the air-permeable surface section.

Preferably, the base body and the at least one air-permeable area section are made of different materials. According to another embodiment, the base body and the at least one air-permeable surface section are made of the same material.

The base body preferably consists of the following materials alone or in combination: metallic materials, plastic materials, thermoplastic materials, such as polyamide, polypropylene, HDPE, polycarbonate, PEI, PPS, PEEK, PEKK, PET or aramid, glassy materials, carbon materials, natural fibers, cellulose, flax, rattan or basalt PP.

Preferably, the base body is made of air-impermeable or preferably substantially air-impermeable material. Preferably, the air permeability of the base body is below the minimum air permeability of the air-permeable surface section, in particular below half the minimum air permeability of the surface section.

It is also an object of the invention to provide a vehicle train comprising a pulling vehicle and a pulled vehicle having a wind deflector system attached to the pulling vehicle.

Preferably, the wind deflector system comprises deflector elements having air-permeable surface sections, the deflector elements being arranged at least on both lateral edges of a rear wall of the pulling vehicle.

According to a particular embodiment, only lateral deflector elements are provided so that the gap is open at the top.

Laterally provided deflector elements may already be sufficient to achieve significant fuel savings. The directed inflow of air into the gap, which is open at the top, creates an upwardly oriented flow that counteracts an airflow entering from above and keeps this airflow away from the gap. Turbulence that could be caused by the air flow penetrating from above is thus prevented.

At higher vehicle speeds, the air flow entering the gap from above also intensifies, increasing the risk of vortex formation. Such vortex formation, which depends on the vehicle speed, can be effectively counteracted by using elastic materials in the air-permeable surface sections. When elastic materials are used, it has already been pointed out that at higher vehicle speeds, when a stronger air flow impinges on the deflector elements, the elastic material expands, resulting in greater air permeability. The increase in the amount of air entering the gap automatically strengthens the upflowing airflow, so that vortex formation can be prevented even at higher speeds.

Preferably, the wind deflector system comprises a deflector element having at least one air-permeable surface section, the deflector element being arranged at the upper edge of a rear wall of the pulling vehicle.

This embodiment in conjunction with side deflector elements is advantageous if the air flowing in through the side sections is insufficient to form a correspondingly large counterflow. In this case, it is advantageous if the air flowing in from above is also slowed down and homogenized.

The term edge also refers to an edge area.

Preferably, the pulled vehicle comprises an auxiliary unit located in the gap. Preferably, the air-permeable surface section is disposed adjacent to the auxiliary unit.

Preferably, the deflector element is a passive deflector element or an active deflector element.

A passive deflector element is characterized by having a flexibility that allows articulation between the pulling vehicle and the pulled vehicle without creating damage to the deflector element or the vehicle parts. This flexibility can be achieved by the material of the deflector element itself, by its shape, or by an attachment that allows it to deflect.

By an active deflector element is meant an element that can be moved by means of actuators.

The wind deflector system may preferably comprise one or more air-impermeable deflector elements for covering the gap, on which one or more deflector elements with at least one air-impermeable surface section are arranged.

An air-impermeable deflector element and/or an air-permeable deflector element may be arranged on the pulling vehicle. An air-impermeable deflector element and/or an air-permeable deflector element may also abut the pulled vehicle.

BRIEF DESCRIPTION OF THE DRAWINGS

Exemplary embodiments are explained in more detail below on the basis of the figures.

It is shown in.

DETAILED DESCRIPTION OF THE INVENTION

Figure 1:
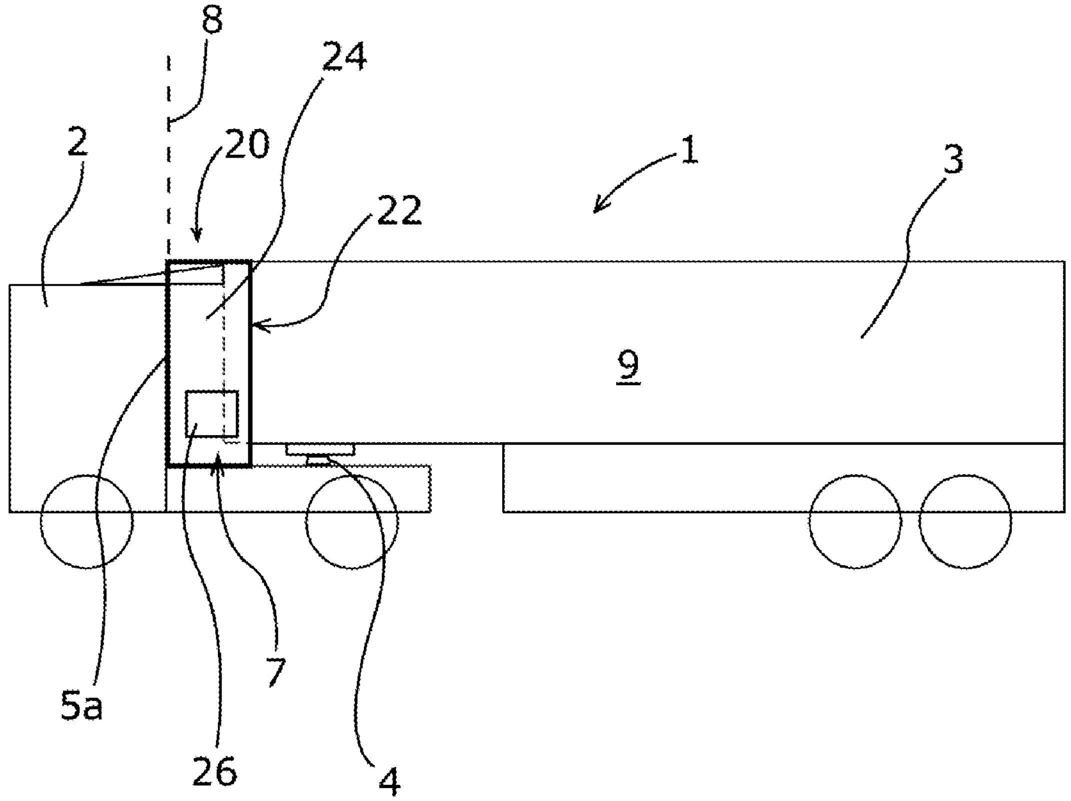
FIG. 1 a semi-trailer truck in side view.
Figure 2:
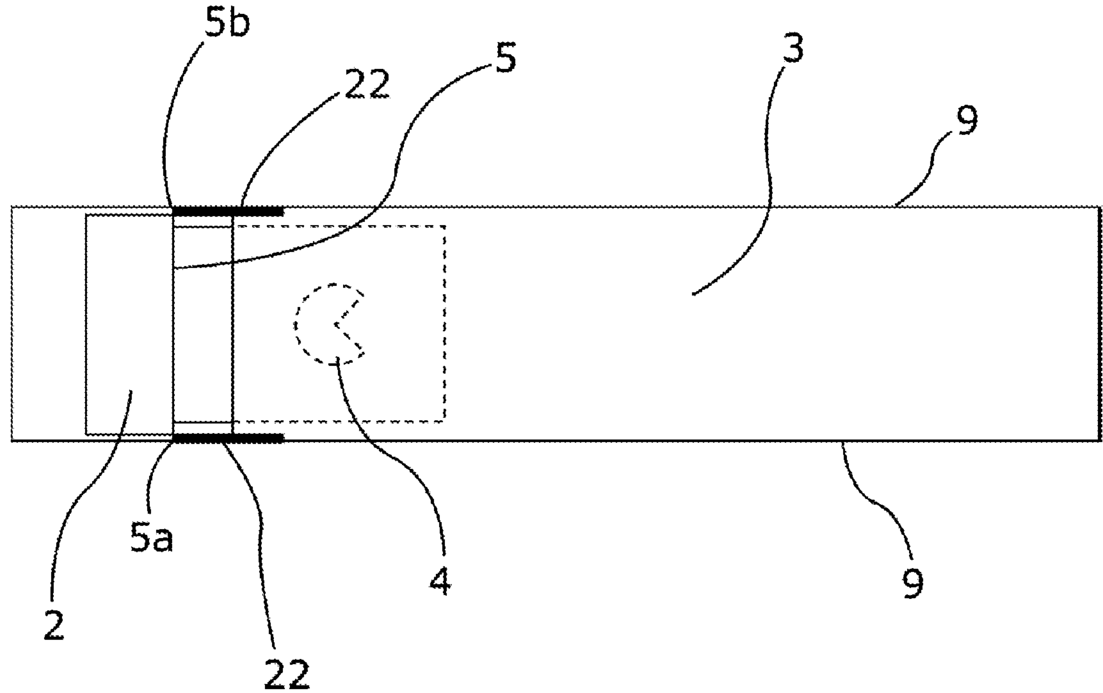
FIG. 2 a plan view of the semi-trailer truck shown in FIG. 1.

In FIGS. 1 and 2, a semi-trailer truck is shown as a vehicle train 1 by way of example, which comprises a pulling vehicle 2 and a pulled vehicle 3, which are coupled to one another by means of a fifth wheel coupling 4.

Between the rear wall 5 of the vehicle 2 and the front wall 6 of the pulled vehicle 3, there is a gap 7 which is covered laterally by a respective deflector element 22 having an air-permeable surface section 26 of a wind deflector system 20. The deflector elements 22 are arranged vertically and are arranged on the lateral edges 5*a*, 5*b* of the rear wall 5 so as to be pivotable about a vertical axis 8. The deflector elements 22 abut the side walls 9 of the vehicle 3.

Figure 3:
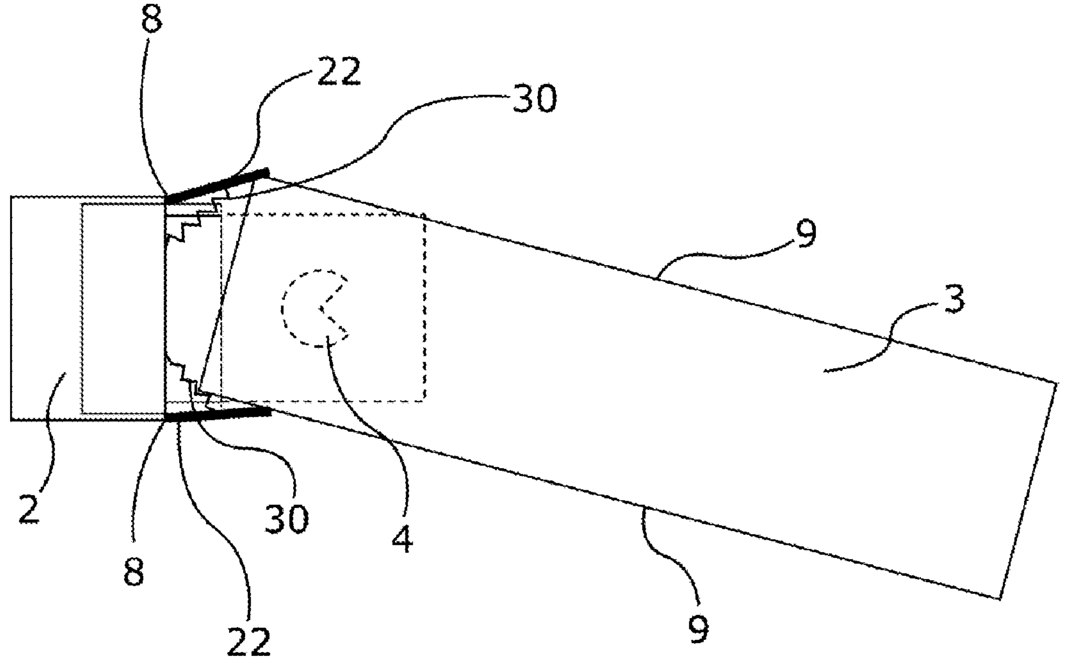
FIG. 3 a plan view of the semi-trailer truck shown in FIGS. 1 and 2 during cornering, FIG. 4*a,b* a deflector element in plan view and in longitudinal section, FIG. 5 a plan view of the front wall of a pulled vehicle, FIG. 6 a plan view of a deflector element according to a further embodiment, FIG. 7*a-c* various embodiments of the air-permeable surface section, FIG. 8 a side view of a semi-trailer truck with a deflector element according to a further embodiment, FIG. 9 a, b a side view and a plan view of a semi-trailer truck with deflector elements whose air-permeable surface sections comprise a brush-like structure, FIG. 10*a, b* enlarged plan views of the deflector element shown in FIGS. 9*a, b*, and FIG. 11 a plan view of a deflector element according to a further embodiment.

FIG. 3 shows the semi-trailer truck during cornering. In this illustration, the deflector elements 22 are each equipped with a tension spring 30, which is attached to the rear wall 5. The tension spring pulls the deflector elements 22 inwards in every driving situation so that the deflector elements 22 always abut the side walls 9 of the vehicle 3. The deflector elements 22 are passive elements.

Figure 4A:
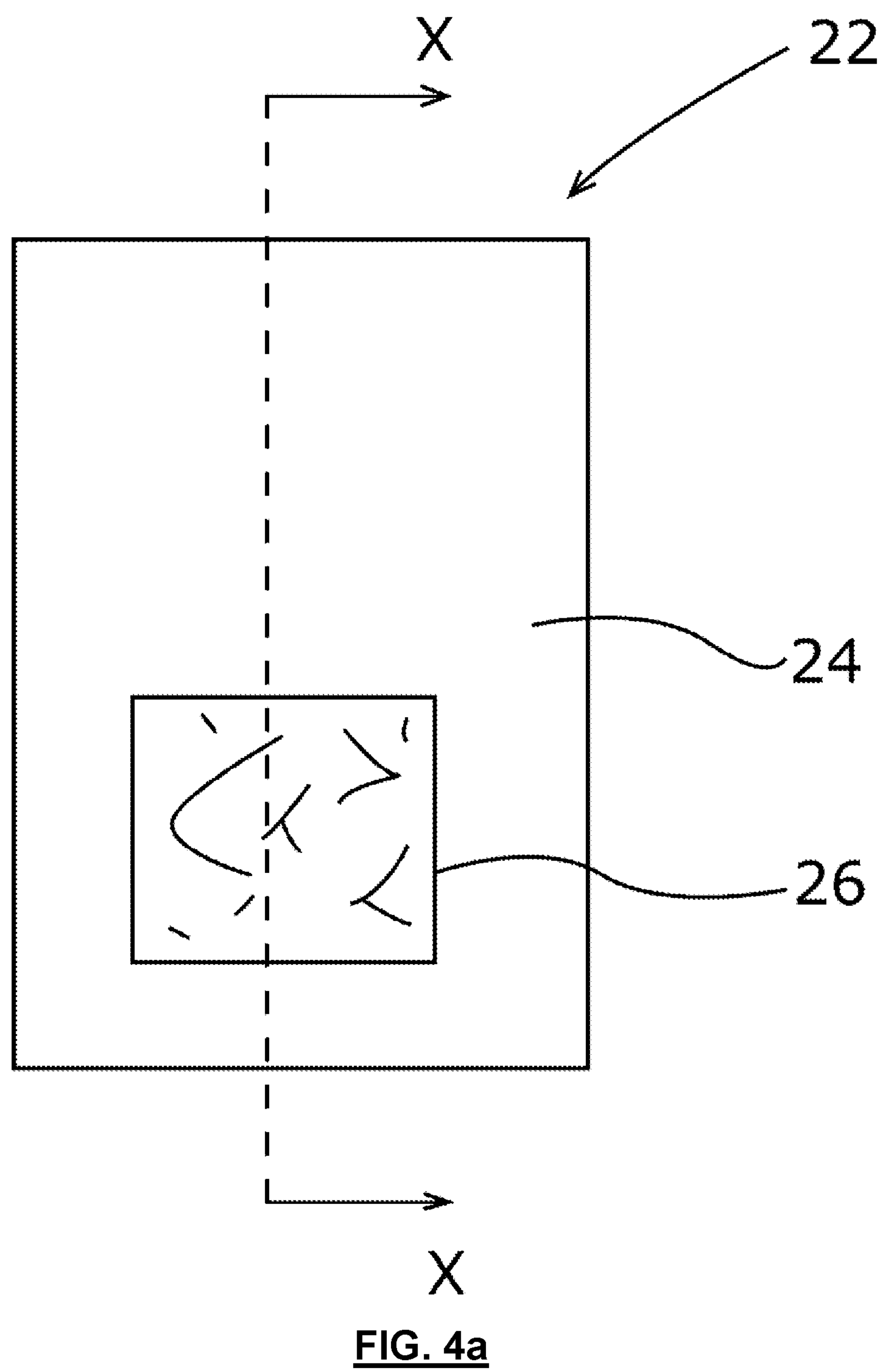
Figure 4B:
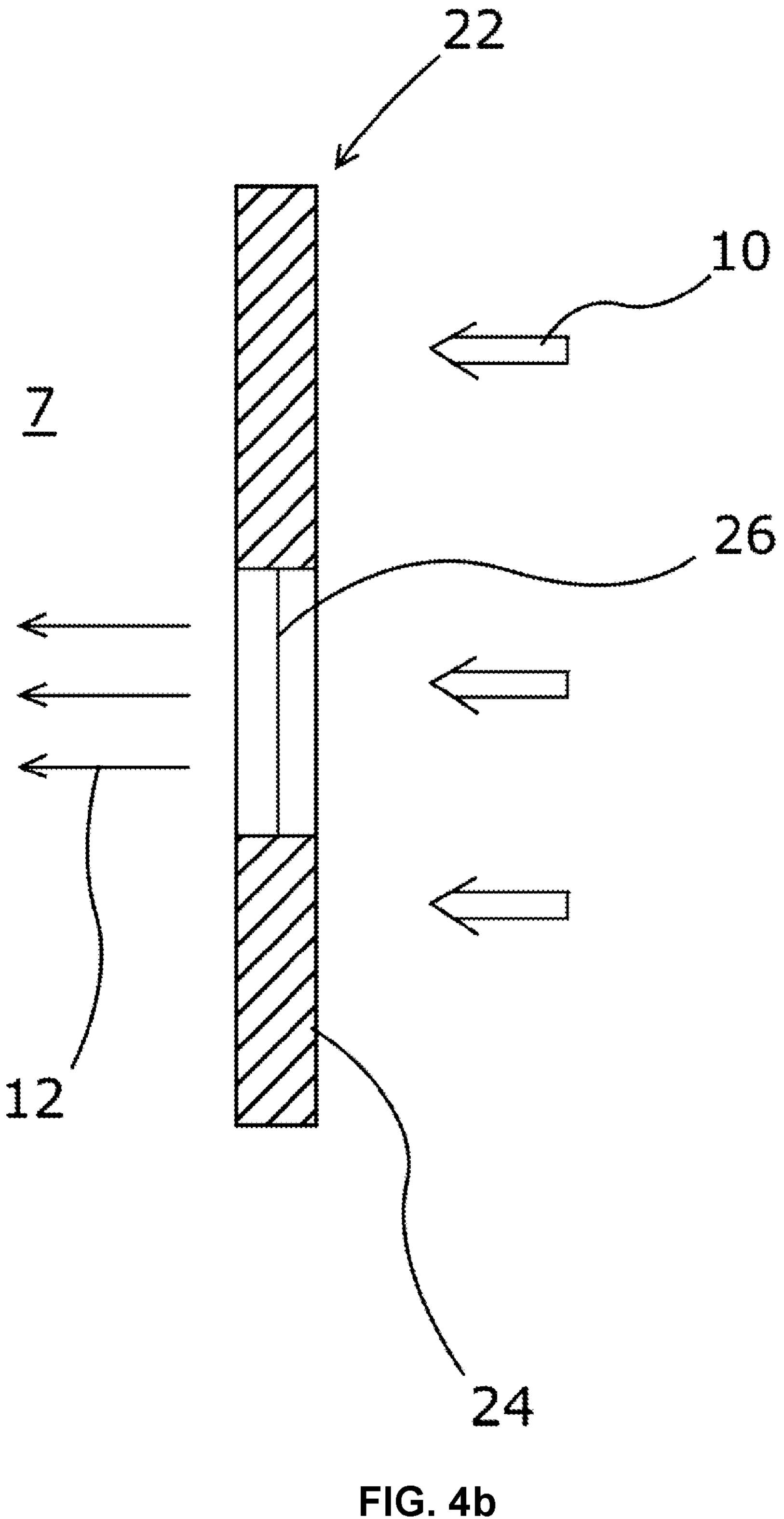

In FIG. 4*a* a deflector element 22 is shown in plan view and in FIG. 4*b* in section along the line X-X in FIG. 4*a*. The deflector element 22 comprises an air-impermeable base body 24 in the form of a plate and an air-permeable surface section 26, which is shown only schematically. The air flow impinging on the deflector element 22 is indicated by the arrows 10. In the area of the surface section 26, the air flow is slowed down, wherein only a predetermined volume flow is allowed to pass from the surface section 26 into the gap 7. The arrows 12 indicate that the passed air flow is homogenized and thus laminar. Turbulence is not contained in this transmitted air flow 12 located in the gap 7.

Figure 5:
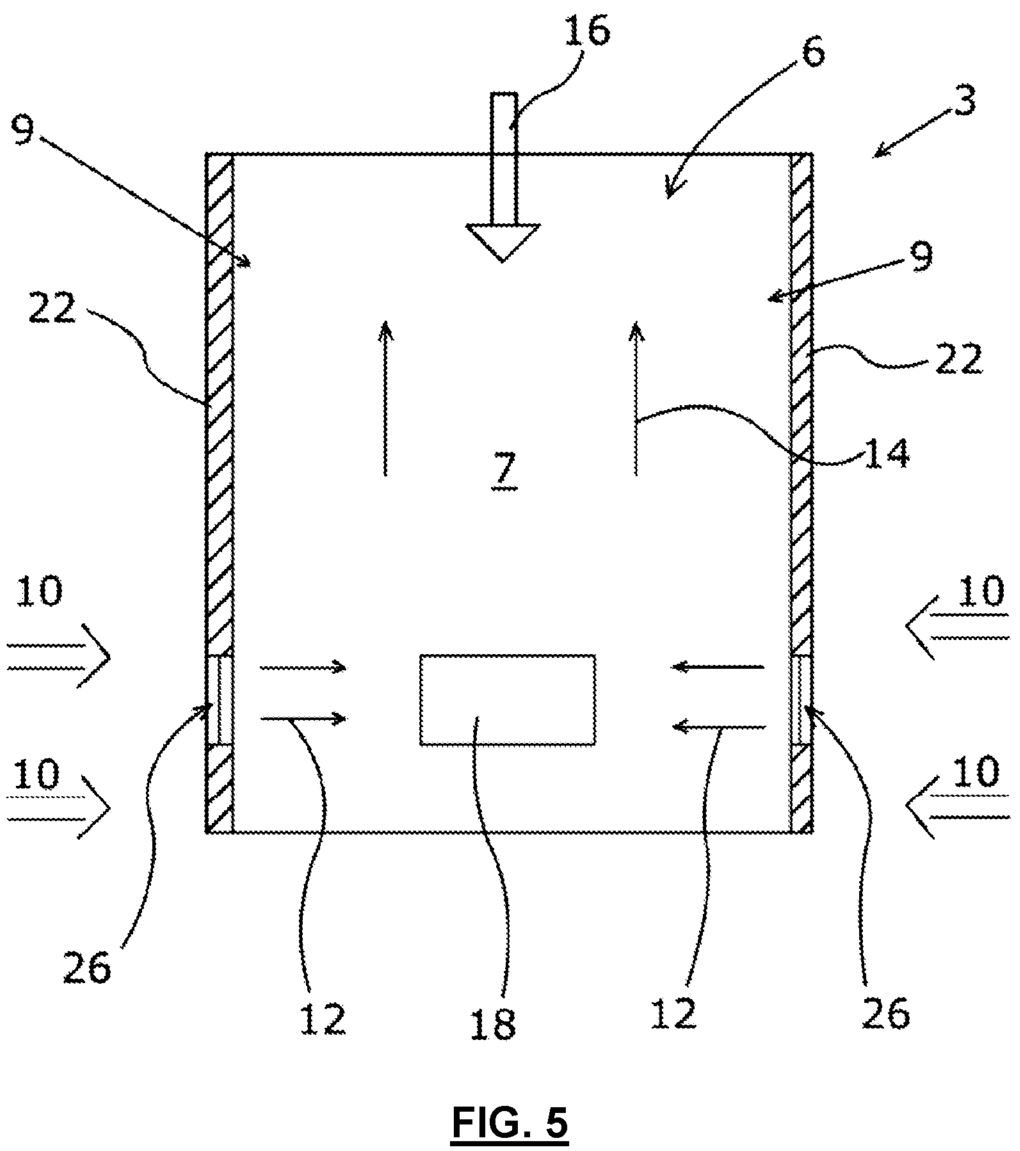

FIG. 5 shows a plan view of a front wall 6 of a pulled vehicle 3 on whose side walls 9 deflector elements 22 abut according to FIGS. 4*a* and 4*b*. An auxiliary unit 18 in the form of a cooling unit, which is operated by means of an internal combustion engine, is located on the front wall 6 in the lower region. The air-permeable surface sections 26 of the deflector elements 22 are arranged adjacent to the cooling unit 18 so that the internal combustion engine can be supplied with fresh air by the shortest route.

The air flow 12 escapes upwardly and is indicated there by the arrows 14. This flow 14 counteracts a flow 16 entering from above and prevents it from entering the gap 7. Vortex formation is thus largely prevented in the gap.

Figure 6:
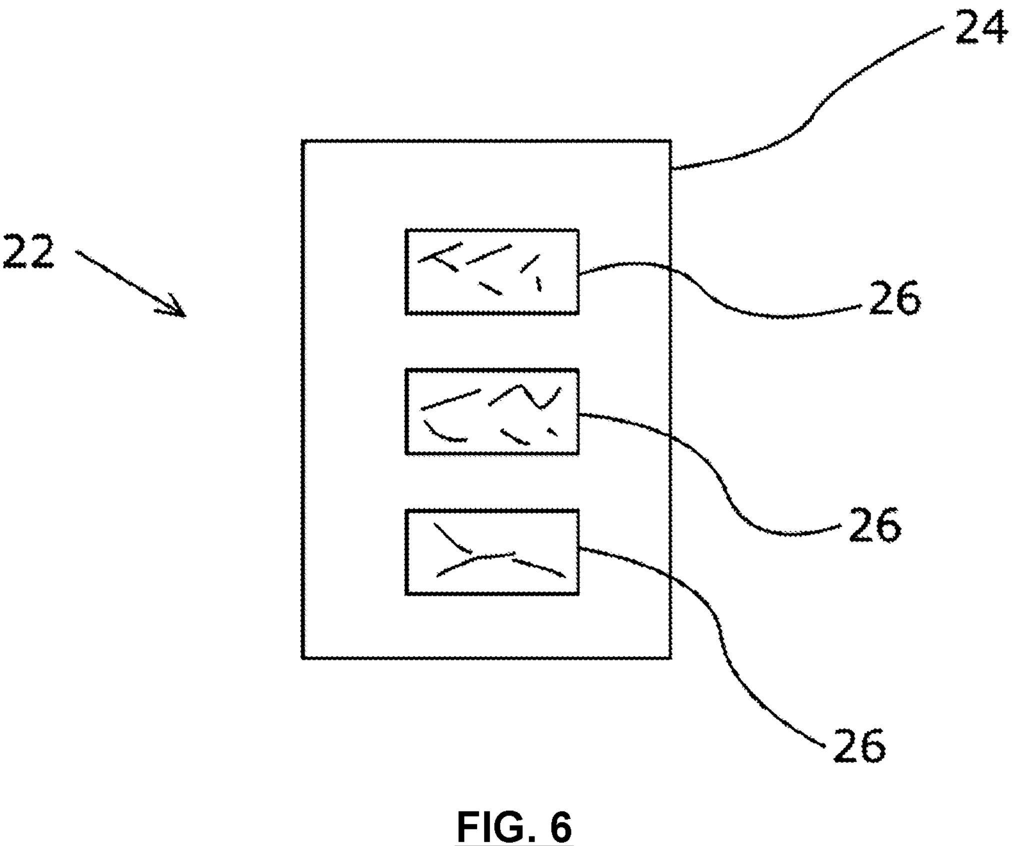

FIG. 6 shows a plan view of a deflector element 22, which comprises three air-permeable surface sections 26, which may be designed identically or differently.

Figure 7A:
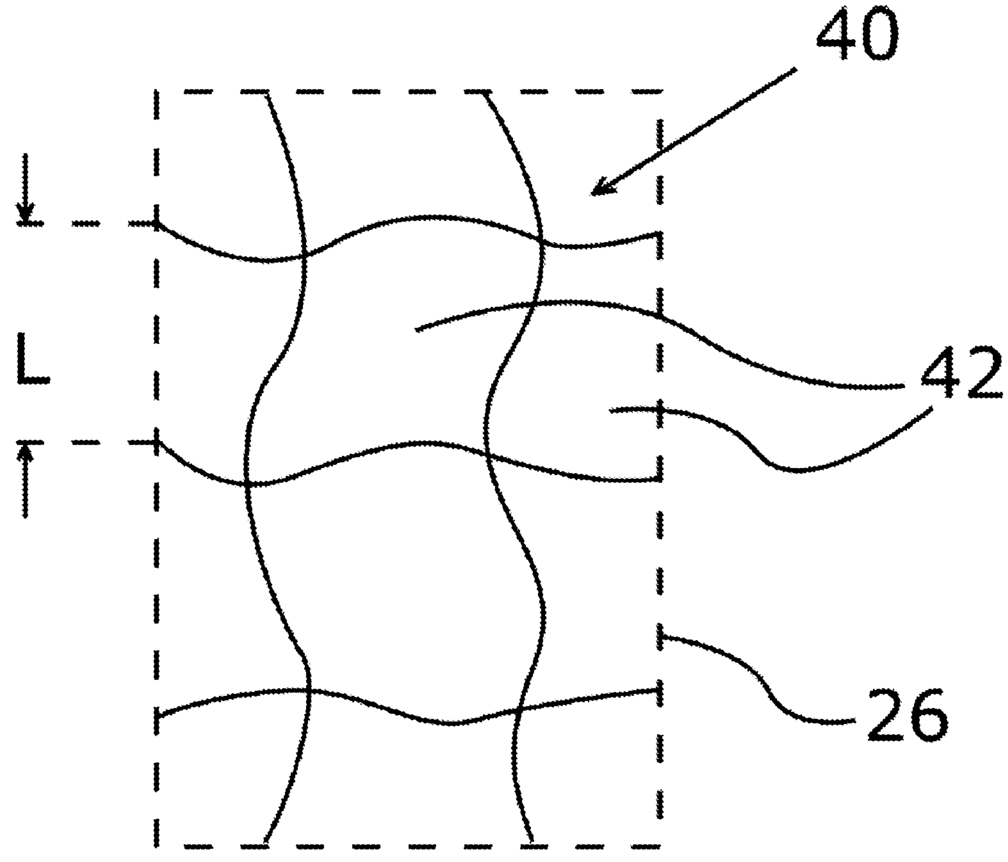
Figure 7B:
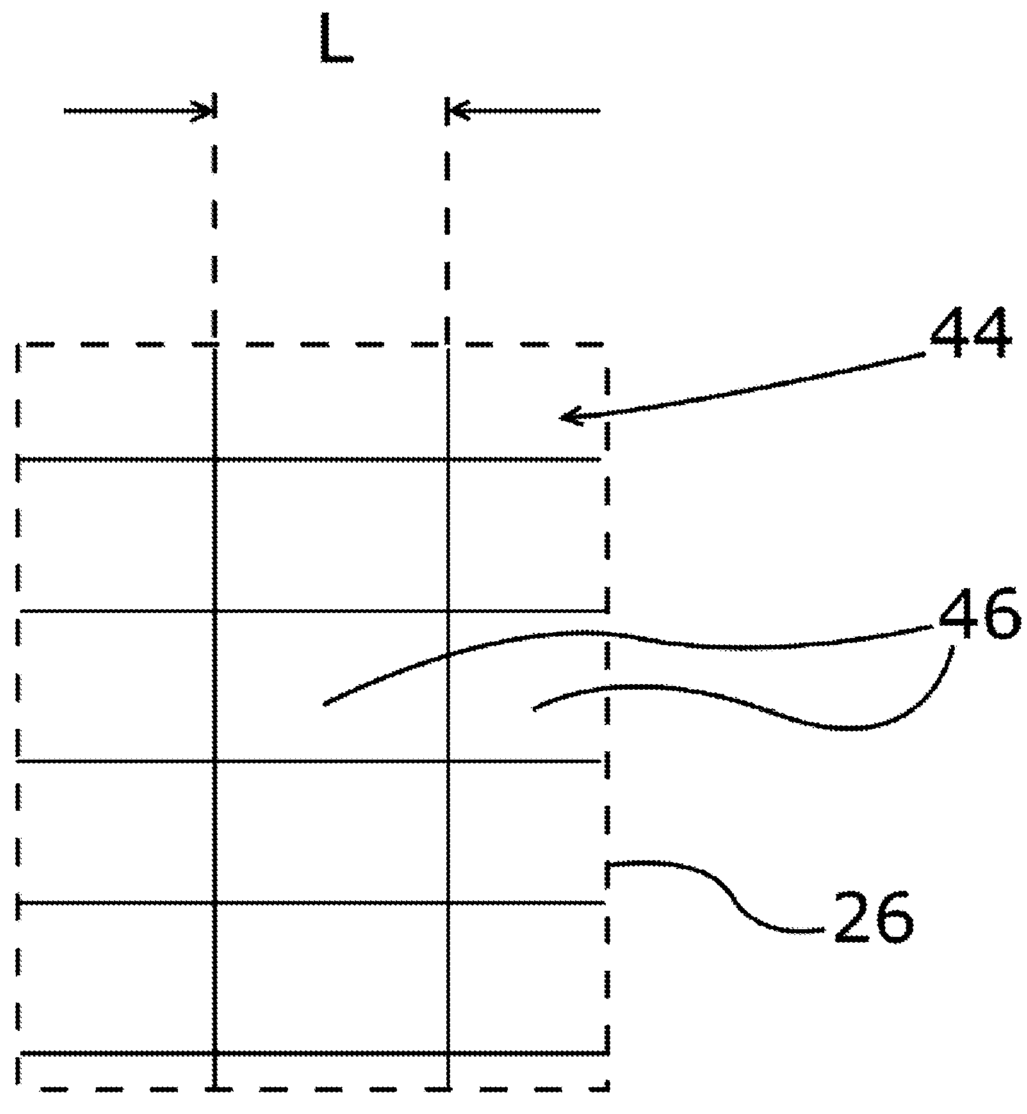
Figure 7C:
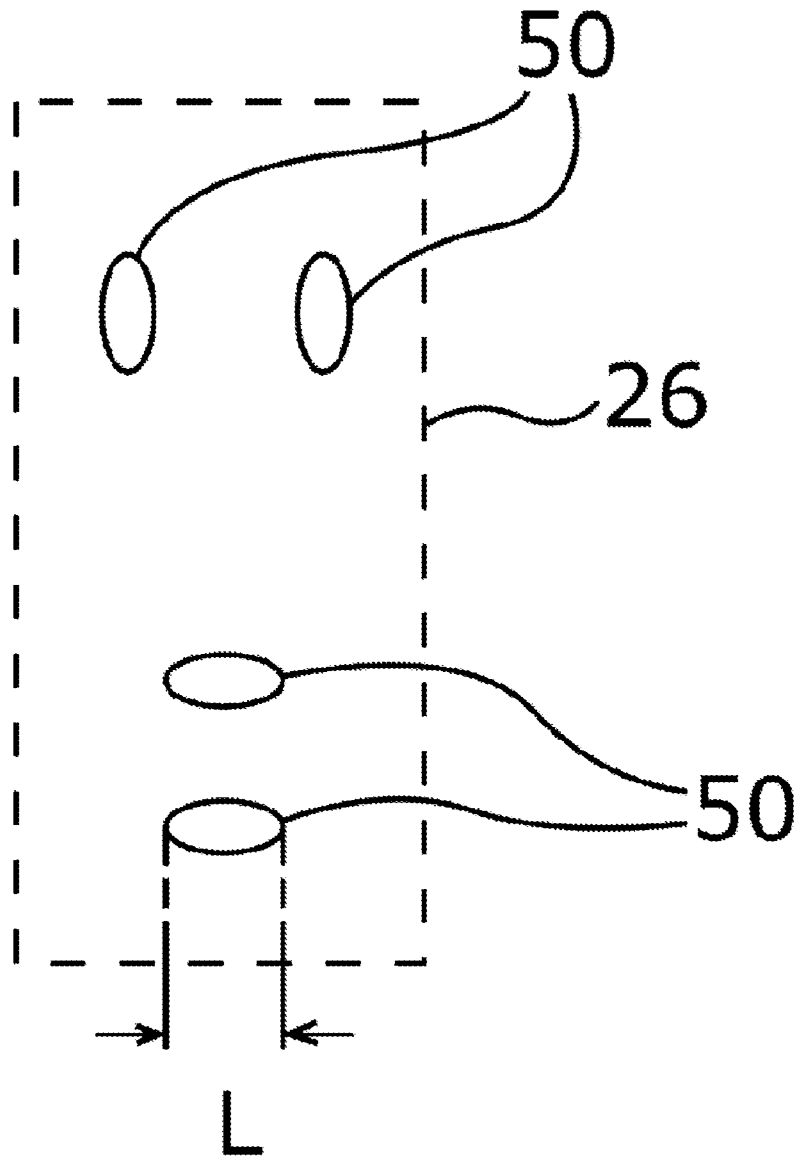

FIGS. 7*a, b* and *c* show enlarged sections of three different surface sections 26 in schematic view. FIG. 7*a* shows a mesh 40 that comprises mesh openings 42. FIG. 7 shows a grid 44 with grid openings 46, and FIG. 7*c* shows horizontally and vertically arranged slit-shaped openings 50. In each of the three figures, the extension L is drawn.

Figure 8:
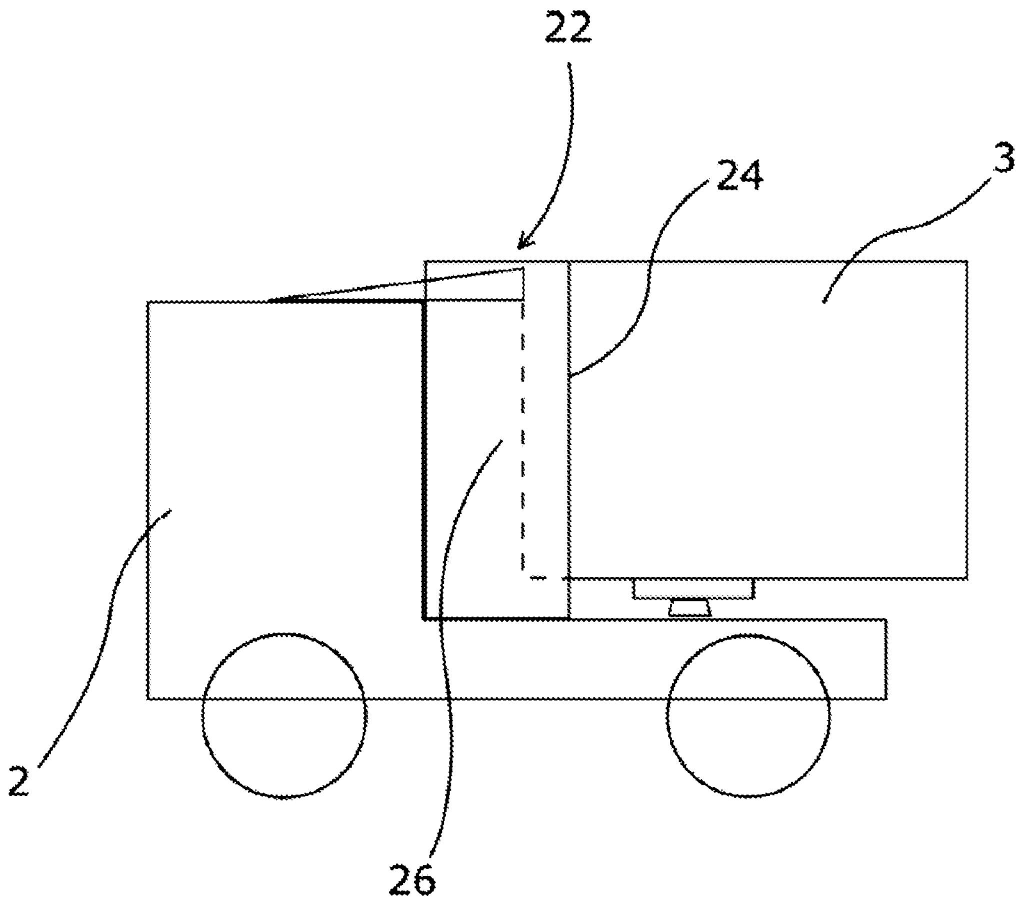

FIG. 8 shows a side view of a semi-trailer truck with a deflector element 22, which comprises a base body 24 in the form of a frame in which a mesh-like material (not shown in drawing) is gripped, filling the air-permeable surface section 26.

Figure 9A:
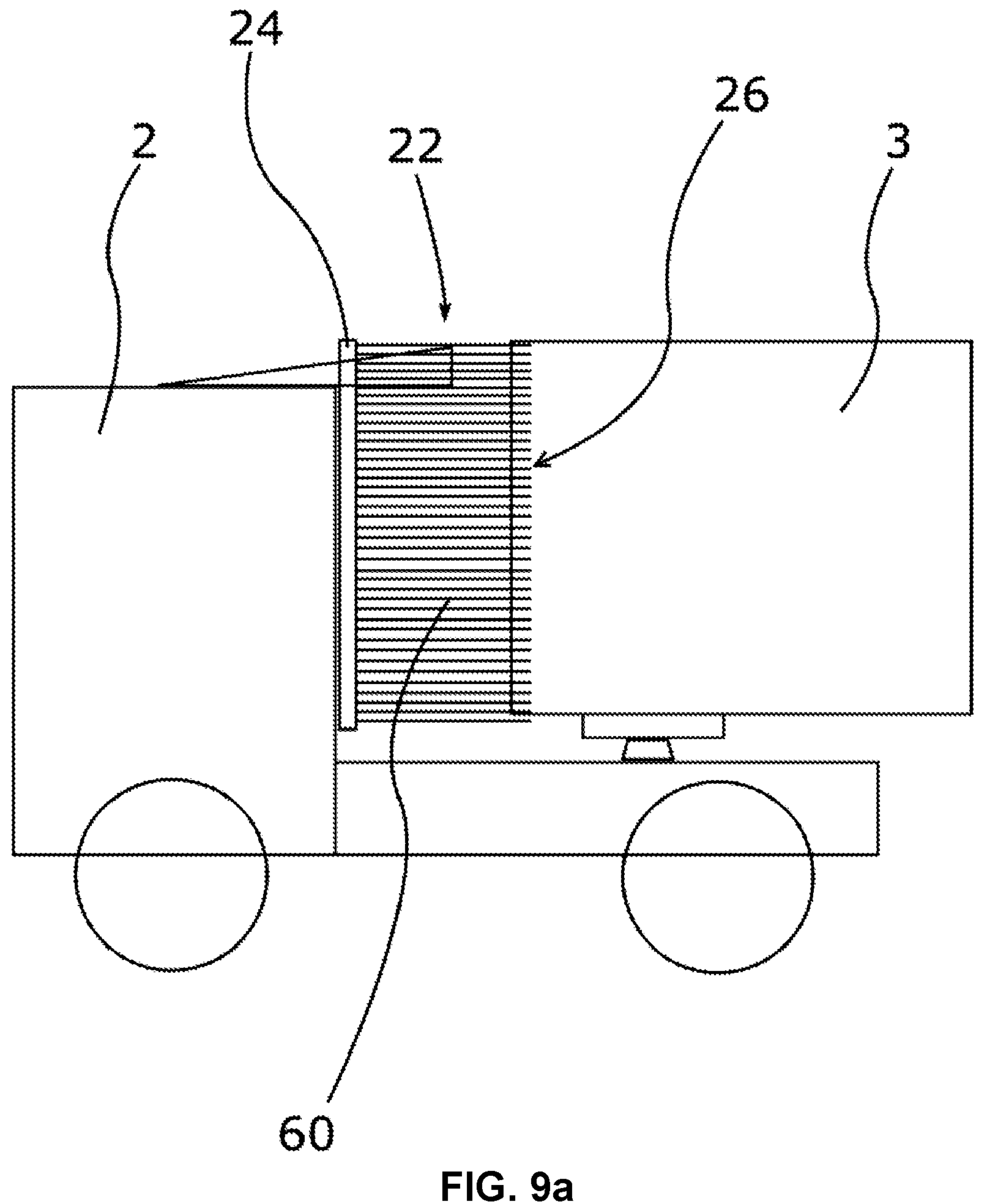
Figure 9B:
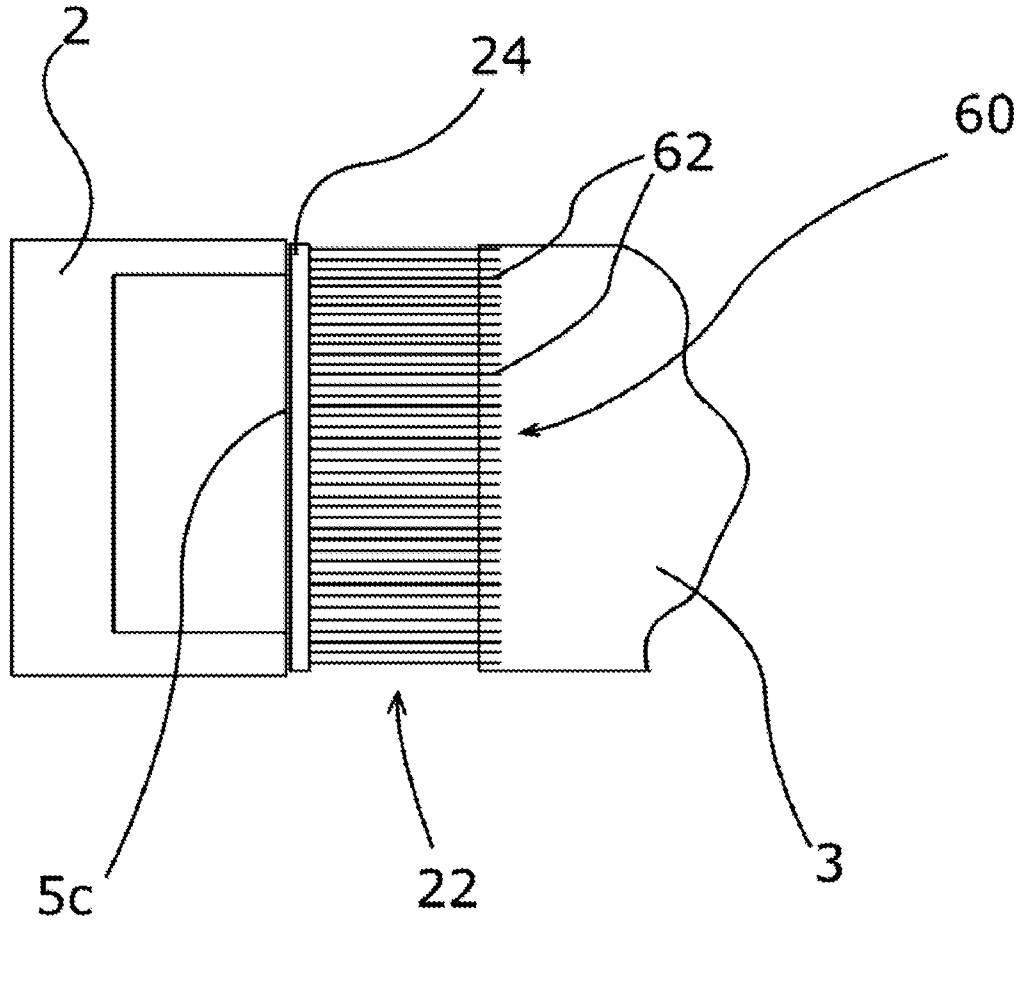
Figure 10A:
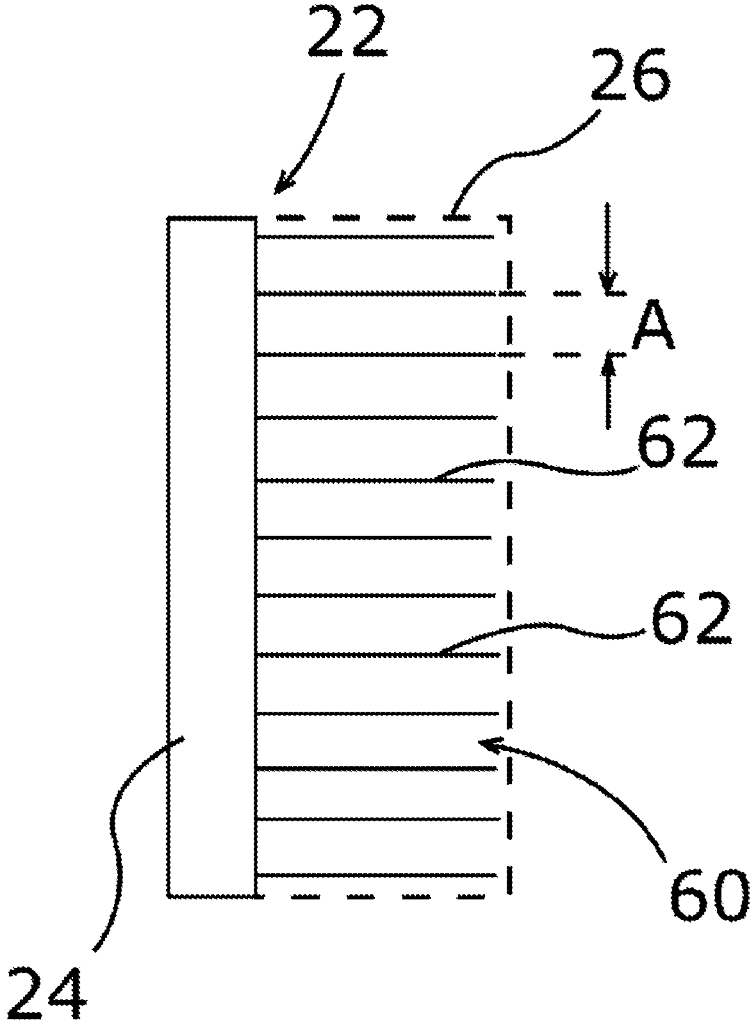
Figure 10B:
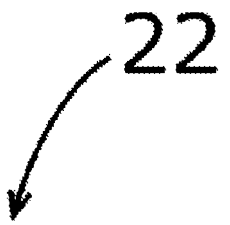
Figure 10B:
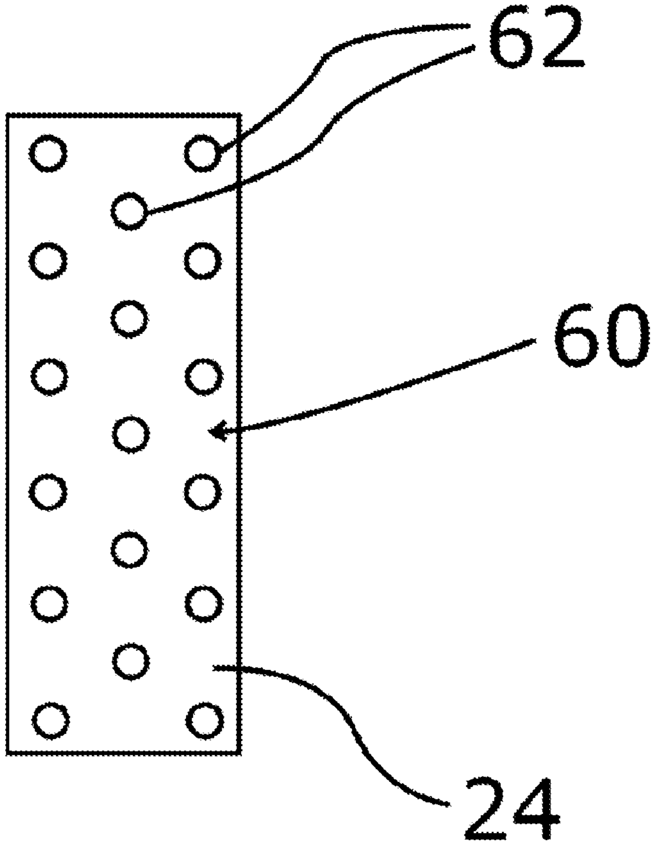

FIG. 9*a* shows a side view and FIG. 9*b* shows a plan view of a semi-trailer truck. The wind deflector system 20 comprises two deflector elements 22 arranged vertically at the sides and a deflector element 22 arranged horizontally at the upper edge 5*c* of the rear wall 5 of the pulling vehicle 2. The deflector elements 22 comprise a base body 24 in the form of a strip and an air-permeable surface section 26 comprising a brush-like structure 60 (see FIG. 10*a*). The brush-like structure 60 comprises a plurality of bristle-like members 62 arranged side by side in a spaced apart manner. In FIG. 10*b*, three rows of these bristle-like elements 62 are provided, wherein the bristle-like elements 62 are arranged offset from each other. A denotes the distance between two bristle-like elements 62.

In FIG. 9*a*, it can be seen that the bristle-like structure 60 abuts against the side wall 9 of the vehicle 3. In this embodiment, the length of the bristle-like elements 62 is greater than the width of the gap 7.

Figure 11:
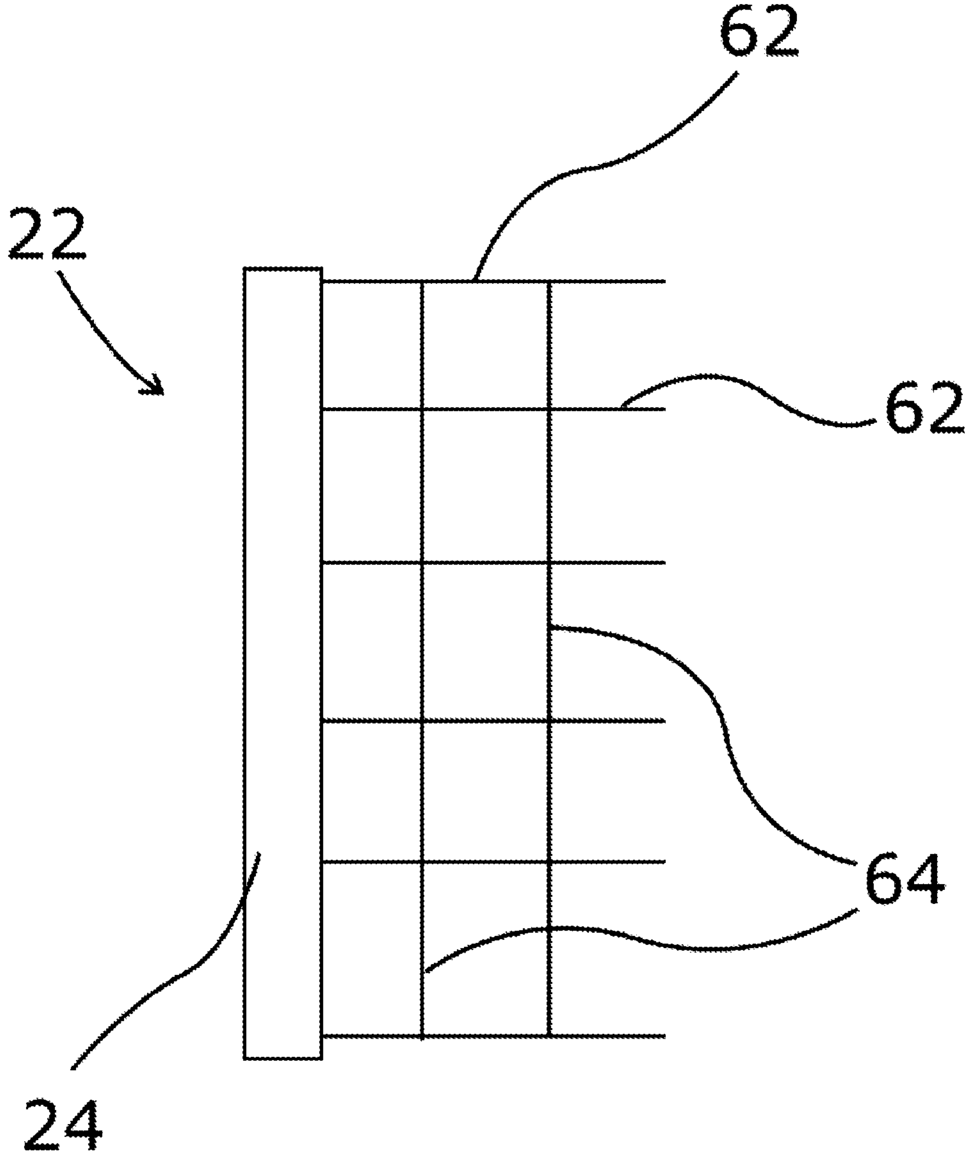

In FIG. 11, another embodiment is shown in which the horizontally oriented bristle-like elements 62 are connected by vertical retaining strips 64, whereby a stiffening of the brush-like structure 60 is achieved. The brush-like structure 60 thus becomes a mesh-like structure 40.

LIST OF REFERENCE SIGNS

1 vehicle train
2 pulling vehicle
3 pulled vehicle
4 fifth wheel
5 rear wall
5*a,b* lateral edge of rear wall
5*c* upper edge
6 front wall
7 gap
8 vertical axis
9 side wall
10 impinging air flow, arrow
12 passed air flow, arrow
14 rising air flow, arrow
16 incoming air flow from above
18 auxiliary unit
20 wind deflector system
22 deflector element
24 base body
26 air-permeable surface section
30 tension spring
40 mesh, mesh-like structure, mesh-like material
42 mesh opening
44 grid-like material, grid
46 grid opening
50 slit-like opening
60 brush-like structure
62 bristle-like element
64 retaining strip
A Distance between two bristle-like elements
L extension

What is claimed is:

1. A wind deflector system for at least partially covering a gap between a pulling vehicle and a pulled vehicle coupled to the pulling vehicle, comprising:
at least one deflector element attachable to the pulling vehicle,
wherein the at least one deflector element comprises an air-impermeable base body with at least one air-permeable surface section,
wherein the base body is a plate, a plate-like structure, a strip, a frame, a partial frame or a frame section, and
wherein the air-permeable surface section comprises a fabric-like material, a mesh-like material with mesh openings or a grid-like material with grid openings.

2. The wind deflector system according to claim 1, wherein the air-permeable surface section comprises a predetermined minimum air permeability.

3. The wind deflector system according to claim 1, wherein the fabric-like material is a mesh fabric with openings.

4. The wind deflector system according to claim 1, wherein the fabric-like material or the mesh-like material is made of a thermoplastic material.

5. The wind deflector system according to claim 1, wherein the mesh-like material consists of an elastic thermoplastic material.

6. The wind deflector system according to claim 1, wherein the grid-like material is made of a metallic material.

7. The wind deflector system according to claim 3, wherein the openings have a greatest extension L of 0.1 mm to 10 mm.

8. The wind deflector system according to claim 3, wherein the openings cover 10% to 50% of the air-permeable surface section.

9. The wind deflector system according to claim 1, wherein the deflector element comprises a surface section with a brush-like structure.

10. The wind deflector system according to claim 9, said brush-like structure comprises bristle-like elements attached to said base body.

11. The wind deflector system according to claim 10, wherein said bristle-like elements are arranged in at least one row side by side and spaced apart.

12. The wind deflector system according to claim 10, wherein the bristle-like elements are made of a thermoplastic material.

13. The wind deflector system according to claim 10, wherein the bristle-like elements are aligned horizontally when the deflector element is attached to the vehicle.

14. The wind deflector system according to claim 10, wherein the bristle-like elements comprise a diameter of 0.5 mm to 5 mm.

15. A vehicle train, comprising:

a pulling vehicle, a pulled vehicle, and a wind deflector system attached to the pulling vehicle according to claim 1.

16. The vehicle train according to claim 15, wherein the wind deflector system comprises deflector elements with air-permeable surface sections, the deflector elements being arranged at least on both lateral edges of a rear wall of the pulling vehicle.

17. The vehicle train according to claim 15, wherein the wind deflector system comprises a deflector element with at least one air-permeable surface section, the deflector element being arranged at the upper edge of a rear wall of the pulling vehicle.

18. The vehicle train according to claim 15, wherein the pulled vehicle comprises an auxiliary unit located in the gap, and that the air-permeable surface section is arranged adjacent to the auxiliary unit.

19. The vehicle train according to claim 15, wherein the deflector element is a passive deflector element or an active deflector element.

20. A wind deflector system for at least partially covering a gap between a pulling vehicle and a pulled vehicle coupled to the pulling vehicle, comprising:

at least one deflector element attachable to a vehicle, wherein the at least one deflector element comprises a base body with at least one air-permeable surface section, and wherein the deflector element comprises a surface section with a brush-like structure.

* * * * *